United States Patent
Shackelford

(10) Patent No.: US 11,042,368 B1
(45) Date of Patent: Jun. 22, 2021

(54) SCALABLE SOFTWARE DEVELOPMENT AND DEPLOYMENT SYSTEM USING INVERSION OF CONTROL ARCHITECTURE

(71) Applicant: Express Scripts Strategic Development, Inc., St. Louis, MO (US)

(72) Inventor: Floyd W. Shackelford, St. Louis, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 16/731,267

(22) Filed: Dec. 31, 2019

(51) Int. Cl.
| | |
|---|---|
| *G06F 8/71* | (2018.01) |
| *G06F 8/60* | (2018.01) |
| *G06F 8/51* | (2018.01) |
| *G06F 8/20* | (2018.01) |
| *G06F 8/36* | (2018.01) |
| *G06F 8/34* | (2018.01) |

(52) U.S. Cl.
CPC ............... *G06F 8/71* (2013.01); *G06F 8/20* (2013.01); *G06F 8/34* (2013.01); *G06F 8/36* (2013.01); *G06F 8/51* (2013.01); *G06F 8/60* (2013.01)

(58) Field of Classification Search
CPC .......... G06F 8/20–35; G06F 8/36; G06F 8/51; G06F 8/60; G06F 8/70–72
USPC ........ 717/104–107, 109, 110, 113, 120–121, 717/168–178
See application file for complete search history.

(56) References Cited

U.S. PATENT DOCUMENTS

| | | | |
|---|---|---|---|
| 6,489,848 B2 | 12/2002 | Smith | |
| 6,600,372 B2 | 7/2003 | Prentice | |
| 7,602,240 B2 | 10/2009 | Gao | |
| 8,183,933 B2 | 5/2012 | Halder | |
| 8,269,661 B2 | 9/2012 | Corsi | |
| 8,310,307 B2 | 11/2012 | Kawaguchi | |

(Continued)

OTHER PUBLICATIONS

Yue, D., et al., Based on SOA architecture and component software reuse architecture research, 2010 2nd IEEE International Conference on Information Management and Engineering, Apr. 16-18, 2010, 4 pages, [retrieved on Feb. 12, 2021], Retrieved from the Internet: <URL:http://ieeexplore.ieee.org/>.*

(Continued)

*Primary Examiner* — Geoffrey R St Leger
(74) *Attorney, Agent, or Firm* — Harness, Dickey & Pierce, PLC

(57) ABSTRACT

A computer-readable medium stores instructions including executing a first application. In response to a first configuration specification, the instructions configure a first choreographer, which requires at least one collector and at least one emitter and defines a sequence of processing stages. The first configuration specification specifies which available collectors, which available emitters will be used. The first configuration specification specifies, for each stage, which available processors will be invoked. The instructions include, in response to a reconfiguration request for the first application, pausing each of the at least one collector; subsequent to pausing the at least one collector, pausing each stage of the sequence of processing stages; subsequent to pausing the processors, pausing each of the at least one emitter; and subsequent to pausing the at least one emitter, configuring the first choreographer according to a second configuration specification.

20 Claims, 13 Drawing Sheets

(56) References Cited

U.S. PATENT DOCUMENTS

| | | | | |
|---|---|---|---|---|
| 9,496,250 | B2 | 11/2016 | Jain | |
| 10,761,813 | B1* | 9/2020 | Echeverria | G06N 5/04 |
| 10,778,686 | B2* | 9/2020 | Palmer | H04L 63/10 |
| 2006/0036745 | A1* | 2/2006 | Stienhans | G06F 8/38 |
| | | | | 709/228 |
| 2007/0085574 | A1 | 4/2007 | Lo | |
| 2007/0252651 | A1 | 11/2007 | Gao | |
| 2013/0212558 | A1* | 8/2013 | Archer | G06F 8/34 |
| | | | | 717/109 |
| 2013/0241628 | A1 | 9/2013 | Zhang | |
| 2014/0278312 | A1* | 9/2014 | Nixon | G06F 8/34 |
| | | | | 703/6 |
| 2020/0151038 | A1* | 5/2020 | Lingamneni | G06F 8/31 |

OTHER PUBLICATIONS

Lüer, C., et al., The evolution of software evolvability, IWPSE '01: Proceedings of the 4th International Workshop on Principles of Software Evolution, Sep. 2001, pp. 134-137, [retrieved on Feb. 12, 2021], Retrieved from the Internet: <URL:http://dl.acm.org/>.*

\* cited by examiner

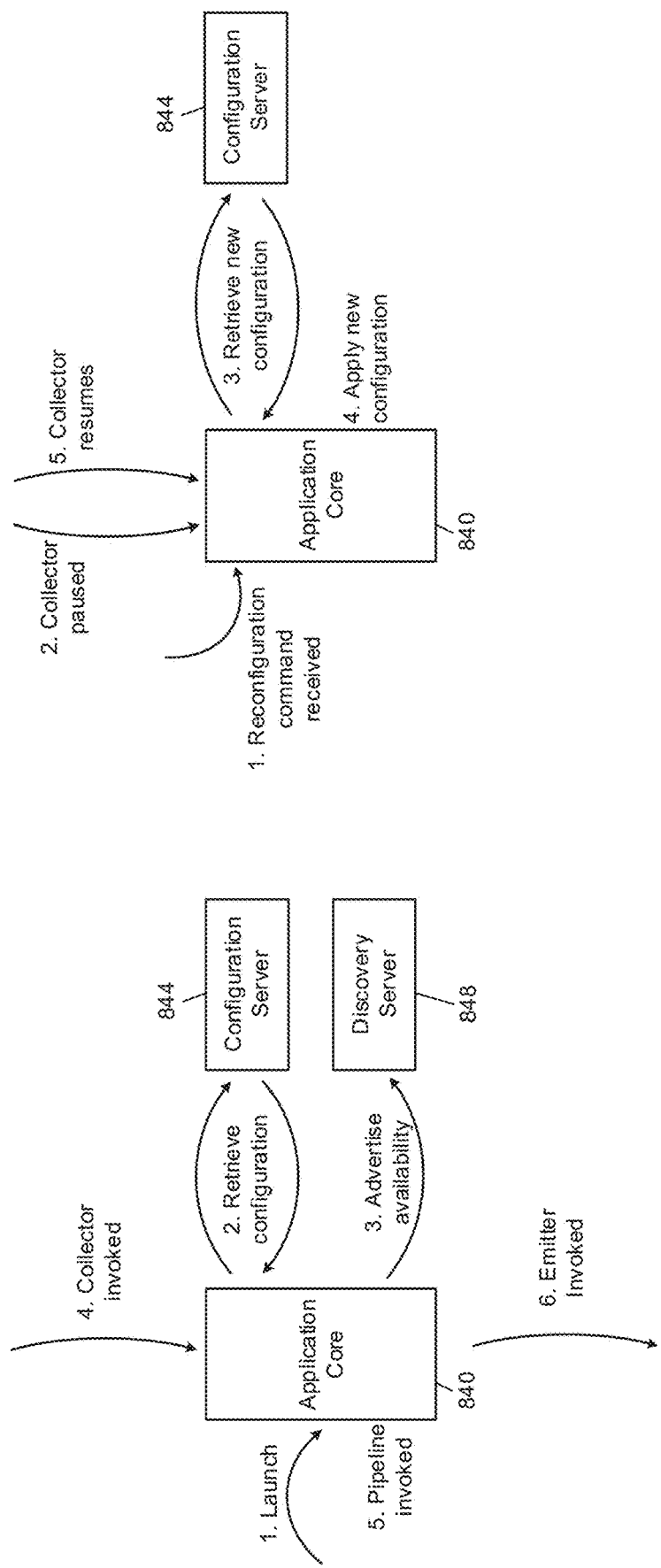

SCALABLE SOFTWARE DEVELOPMENT AND DEPLOYMENT SYSTEM USING INVERSION OF CONTROL ARCHITECTURE

COMPUTER PROGRAM LISTING APPENDIX

A computer program listing appendix is electronically submitted with this application and includes the following text files, the entire contents of which are hereby incorporated by reference:

| NAME | SIZE (BYTES) | CREATION DATE |
| --- | --- | --- |
| AbstractChoreographerException_kt.txt | 619 | 2019 Jan. 15 |
| AbstractJavalinPUTPOSTController_kt.txt | 5,270 | 2019 Jul. 11 |
| AbstractPUTPOSTControllerConfiguration_kt.txt | 2,429 | 2019 Jul. 11 |
| AbstractPUTPOSTController_kt.txt | 2,500 | 2019 Jul. 11 |
| ActiveStatusDto_kt.txt | 515 | 2019 Jan. 15 |
| AddressableStructDto_kt.txt | 799 | 2019 Apr. 3 |
| AgencyIdentifierDto_kt.txt | 342 | 2019 Jan. 15 |
| AgencyIdentifiersDto_kt.txt | 479 | 2019 Jan. 15 |
| agencyIdentifier_json_pretty.txt | 1,234 | 2019 Dec. 31 |
| agencyIdentifier_json_squashed.txt | 838 | 2018 Aug. 4 |
| AliasableProcessor_kt.txt | 1,682 | 2019 Jul. 25 |
| AliasesSubConfiguration_kt.txt | 2,701 | 2019 Jul. 22 |
| AlwaysCreateOperationExtractor_kt.txt | 551 | 2019 Jul. 11 |
| AlwaysCreateProvisionerConfiguration_kt.txt | 1,014 | 2019 Jul. 11 |
| AlwaysCreateProvisioner_kt.txt | 708 | 2019 Jul. 11 |
| AlwaysUpdateOperationExtractor_kt.txt | 551 | 2019 Jul. 11 |
| Annotations_kt.txt | 1,098 | 2019 Apr. 16 |
| application-devlopment_yaml.txt | 75 | 2018 Aug. 4 |
| application-local_yaml.txt | 1,741 | 2018 Aug. 4 |
| application-service_yaml.txt | 75 | 2018 Aug. 4 |
| application-test_yaml.txt | 1,203 | 2019 Jan. 15 |
| application-unsecure_yaml.txt | 309 | 2018 Aug. 4 |
| ApplicationException_kt.txt | 474 | 2019 Jul. 11 |
| ApplicationPropertyDelegates_kt.txt | 15,495 | 2019 Jul. 22 |
| application_yaml.txt | 671 | 2018 Aug. 4 |
| ApplicatorSharedTest_kt.txt | 7,494 | 2019 Jul. 25 |
| ApplicatorShared_kt.txt | 2,312 | 2019 Jul. 11 |
| bootstrap-local_yaml.txt | 54 | 2018 Aug. 4 |
| BumbleBee_kt.txt | 16,901 | 2019 Jul. 22 |
| CannotProvisionException_kt.txt | 427 | 2019 Jan. 15 |
| ChoreographerConfigurationAliasesTest_kt.txt | 7,059 | 2019 Jul. 22 |
| ChoreographerConfigurationDelegatedPropertiesTest_kt.txt | 26,979 | 2019 Jul. 22 |
| ChoreographerConfigurationPropertyDelegates_kt.txt | 24,255 | 2019 Dec. 31 |
| ChoreographerIntegrationTest_kt.txt | 9,760 | 2019 Jul. 25 |
| ChoreographerInterfaces_kt.txt | 22,914 | 2019 Jul. 22 |
| ChoreographerObservables_kt.txt | 10,112 | 2019 Jul. 11 |
| ChoreographerTest_kt.txt | 14,252 | 2019 Jul. 25 |
| ChoreographerWhiteboard_kt.txt | 13,862 | 2019 Jul. 22 |
| Choreographer_kt.txt | 8,592 | 2019 Jul. 25 |
| ClassSpecificationException_kt.txt | 487 | 2019 Jan. 15 |
| ClientNetworkAffiliationDto_kt.txt | 199 | 2019 Jan. 15 |
| ClientNetworkDto_kt.txt | 157 | 2019 Jan. 15 |
| ConfigurationException_kt.txt | 452 | 2019 Apr. 16 |
| ContextDto_kt.txt | 151 | 2019 Jan. 15 |
| Core_kt.txt | 249 | 2019 Jul. 25 |
| CountryDto_kt.txt | 228 | 2019 Jan. 15 |
| create-kafka-channels_bat.txt | 811 | 2018 Aug. 4 |
| DatabaseException_kt.txt | 441 | 2019 Jan. 15 |
| DataException_kt.txt | 440 | 2019 Jan. 15 |
| DataTypesSubConfigurationDSL_kt.txt | 1,928 | 2019 Jul. 25 |
| DataTypesSubConfigurationTest_kt.txt | 4,666 | 2019 Jul. 22 |
| DataTypesSubConfiguration_kt.txt | 7,361 | 2019 Jul. 25 |
| DEAAuthorizationsDto_kt.txt | 399 | 2019 Jan. 15 |
| deaAuthorizations_json_pretty.txt | 833 | 2019 Dec. 31 |
| deaAuthorizations_json_squashed.txt | 518 | 2018 Aug. 4 |
| DefaultApplicationStartupParametersTest_kt.txt | 9,254 | 2019 Jul. 22 |
| DefaultApplicationTest_yaml.txt | 1,078 | 2019 Apr. 16 |
| DefaultApplication_kt.txt | 8,607 | 2019 Jul. 22 |
| DefaultApplicatorConfigurationDSL_kt.txt | 1,233 | 2019 Jul. 25 |
| DefaultApplicatorConfigurationTest_kt.txt | 3,196 | 2019 Jul. 25 |
| DefaultApplicatorConfiguration_kt.txt | 1,413 | 2019 Jul. 25 |
| DefaultApplicatorTest_kt.txt | 56,742 | 2019 Jul. 25 |
| DefaultApplicator_kt.txt | 1,298 | 2019 Jul. 11 |
| DefaultChoreographerConfiguration_kt.txt | 5,640 | 2019 Jul. 22 |
| DefaultMain_kt.txt | 648 | 2019 Jul. 22 |

-continued

| NAME | SIZE (BYTES) | CREATION DATE |
|---|---|---|
| DefaultOperationExtractorConfigurationDSL_kt.txt | 2,094 | 2019 Jul. 25 |
| DefaultOperationExtractorConfigurationTest_kt.txt | 4,284 | 2019 Jul. 22 |
| DefaultOperationExtractorConfiguration_kt.txt | 2,217 | 2019 Jul. 11 |
| DefaultOperationExtractorTest_kt.txt | 6,039 | 2019 Jul. 22 |
| DefaultOperationExtractor_kt.txt | 2,440 | 2019 Jul. 11 |
| DefaultTransformerConfigurationTest_kt.txt | 5,255 | 2019 Jul. 22 |
| DefaultTransformerConfiguration_kt.txt | 2,271 | 2019 Jul. 11 |
| DefaultTransformerTest_kt.txt | 24,661 | 2019 Jul. 22 |
| DefaultTransformer_kt.txt | 8,181 | 2019 Jul. 11 |
| DSLTest_kt.txt | 7,083 | 2019 Jul. 25 |
| EmailAddressDto_kt.txt | 697 | 2019 Apr. 3 |
| EnrollmentStatusDto_kt.txt | 513 | 2019 Jan. 15 |
| EnvironmentVariablesTest_kt.txt | 1,069 | 2019 Dec. 31 |
| EnvironmentVariables_kt.txt | 2,388 | 2019 Dec. 31 |
| FauxValidator_kt.txt | 724 | 2019 Jul. 22 |
| FieldNamesSubConfigurationDSL_kt.txt | 1,153 | 2019 Jul. 25 |
| FieldNamesSubConfigurationTest_kt.txt | 1,349 | 2019 Jul. 22 |
| FieldNamesSubConfiguration_kt.txt | 1,856 | 2019 Jul. 25 |
| FieldValueIndexTest_kt.txt | 3,448 | 2019 Jul. 22 |
| FindMatchingStoreKeySetIndexTest_kt.txt | 4,432 | 2019 Jul. 22 |
| GroupingIndexTest_kt.txt | 3,938 | 2019 Jul. 22 |
| IgnoreMessageException_kt.txt | 468 | 2019 Apr. 16 |
| index_html.txt | 1,205 | 2018 Sep. 11 |
| InjectionUtils_kt.txt | 4,039 | 2019 Jul. 22 |
| InternalErrorException_kt.txt | 448 | 2019 Apr. 16 |
| InvalidRequestFrameworkException_kt.txt | 475 | 2019 May 1 |
| JavalinPOSTControllerConfigurationTest_kt.txt | 1,737 | 2019 Jul. 22 |
| JavalinPOSTControllerConfiguration_kt.txt | 491 | 2019 Jul. 22 |
| JavalinPOSTControllerTest_kt.txt | 44,836 | 2019 Jul. 25 |
| JavalinPOSTController_kt.txt | 3,074 | 2019 Jul. 11 |
| JavalinPUTControllerConfigurationTest_kt.txt | 1,722 | 2019 Jul. 22 |
| JavalinPUTControllerConfiguration_kt.txt | 574 | 2019 Jul. 11 |
| JavalinPUTControllerTest_kt.txt | 29,696 | 2019 Jul. 25 |
| JavalinPUTController_kt.txt | 4,044 | 2019 Jul. 11 |
| jquery.min_js.txt | 86,929 | 2018 Sep. 11 |
| json-squash_sh.txt | 267 | 2018 Aug. 4 |
| JsonUtils_kt.txt | 4,062 | 2019 Jul. 22 |
| KafkaChangeEmitterConfigurationTest_kt.txt | 9,372 | 2019 Jul. 22 |
| KafkaChangeEmitterConfiguration_kt.txt | 612 | 2019 Jul. 22 |
| KafkaChangeEmitterTest_kt.txt | 38,822 | 2019 Jul. 22 |
| KafkaChangeEmitter_kt.txt | 4,160 | 2019 Jul. 22 |
| KafkaChangeIntegrationTest_kt.txt | 272 | 2019 Jul. 22 |
| KafkaCommonConfiguration_kt.txt | 2,765 | 2019 Jul. 11 |
| KafkaEmitterConfigurationTest_kt.txt | 9,963 | 2019 Jul. 22 |
| KafkaEmitterConfiguration_kt.txt | 3,578 | 2019 Jul. 22 |
| KafkaEmitterIntegrationTest_kt.txt | 38,759 | 2019 Jul. 25 |
| KafkaEmitterTest_kt.txt | 11,495 | 2019 Jul. 22 |
| KafkaEmitter_kt.txt | 4,841 | 2019 Jul. 22 |
| KafkaLatestEmitterConfigurationTest_kt.txt | 9,286 | 2019 Jul. 22 |
| KafkaLatestEmitterConfiguration_kt.txt | 610 | 2019 Jul. 22 |
| KafkaLatestEmitterTest_kt.txt | 4,903 | 2019 Dec. 30 |
| KafkaLatestEmitter_kt.txt | 1,543 | 2019 Dec. 30 |
| KafkaProducerSharedConfigurationTest_kt.txt | 4,498 | 2019 Jul. 22 |
| KafkaProducerSharedConfiguration_kt.txt | 3,230 | 2019 Jul. 23 |
| KafkaProducerSharedTest_kt.txt | 5,578 | 2019 Dec. 30 |
| KafkaProducerShared_kt.txt | 2,371 | 2019 Dec. 30 |
| KafkaPubSubIntegrationTest_kt.txt | 12,065 | 2019 Jul. 25 |
| KafkaStreamsTest_kt.txt | 5,778 | 2019 Jul. 22 |
| LanguageDto_kt.txt | 152 | 2019 Jan. 15 |
| main_js.txt | 3,804 | 2018 Nov. 21 |
| MongoDbCollectorConfigurationTest_kt.txt | 8,456 | 2019 Jul. 22 |
| MongoDbCollectorConfiguration_kt.txt | 2,340 | 2019 Jul. 22 |
| MongoDbCollectorKafkaIntegrationTest_kt.txt | 9,561 | 2019 Jul. 22 |
| MongoDbCollectorTest_kt.txt | 9,758 | 2019 Jul. 22 |
| MongoDbCollector_kt.txt | 1,641 | 2019 Jul. 22 |
| MongoDbEmitterConfigurationTest_kt.txt | 2,733 | 2019 Jul. 22 |
| MongoDbEmitterConfiguration_kt.txt | 1,495 | 2019 Jul. 22 |
| MongoDbEmitterTest_kt.txt | 10,007 | 2019 Jul. 25 |
| MongoDbEmitter_kt.txt | 1,554 | 2019 Jul. 22 |
| MongoDbProvisionerConfigurationTest_kt.txt | 7,622 | 2019 Jul. 22 |
| MongoDbProvisionerConfiguration_kt.txt | 4,511 | 2019 Jul. 22 |
| MongoDbProvisionerTest_kt.txt | 13,266 | 2019 Jul. 25 |
| MongoDbProvisioner_kt.txt | 2,446 | 2019 Jul. 22 |
| MongoDbSharedConfigurationTest_kt.txt | 5,970 | 2019 Jul. 22 |
| MongoDbSharedConfiguration_kt.txt | 7,031 | 2019 Jul. 22 |
| MongoDbSharedTest_kt.txt | 68,394 | 2019 Jul. 25 |

-continued

| NAME | SIZE (BYTES) | CREATION DATE |
|---|---:|---|
| MongoDbShared_kt.txt | 13,868 | 2019 Dec. 31 |
| MongoDbUtils | 855 | 2019 Jul. 22 |
| MongoDbUtils_kt.txt | 514 | 2019 Jul. 22 |
| MonitoringController_kt.txt | 2,382 | 2019 Jul. 11 |
| MonitorSharedConfigurationTest_kt.txt | 2,252 | 2019 Jul. 22 |
| MonitorSharedConfiguration_kt.txt | 1,156 | 2019 Jul. 11 |
| MonitorSharedTest_kt.txt | 12,436 | 2019 Jul. 25 |
| MonitorShared_kt.txt | 8,641 | 2019 Jul. 11 |
| NoOpProcessor_kt.txt | 3,026 | 2019 Jul. 22 |
| NotNullPreProcessorTest_kt.txt | 3,633 | 2019 Jul. 22 |
| NotNullPreProcessor_kt.txt | 1,671 | 2019 Jul. 22 |
| NotNullValidatorTest_kt.txt | 2,044 | 2019 Jul. 11 |
| NotNullValidator_kt.txt | 1,517 | 2019 Jul. 22 |
| NullValueException_kt.txt | 436 | 2019 Apr. 16 |
| ObservableEmitterTest_kt.txt | 6,376 | 2019 Jul. 22 |
| ObservableEmitter_kt.txt | 740 | 2019 Jul. 11 |
| OPKafkaConsumerConfigurationDSL_kt.txt | 3,496 | 2019 Jul. 25 |
| OPKafkaConsumerConfigurationTest_kt.txt | 4,730 | 2019 Jul. 22 |
| OPKafkaConsumerConfiguration_kt.txt | 3,711 | 2019 Jul. 11 |
| OPKafkaConsumerTest_kt.txt | 4,192 | 2019 Jul. 22 |
| OPKafkaConsumer_kt.txt | 3,245 | 2019 Jul. 22 |
| OPKafkaProducerConfigurationTest_kt.txt | 2,143 | 2019 Jul. 22 |
| OPKafkaProducerConfiguration_kt.txt | 1,714 | 2019 Jul. 11 |
| OPKafkaProducer_kt.txt | 969 | 2019 Jul. 11 |
| OPKafkaStreamsCollectorConfiguration_kt.txt | 756 | 2019 Jul. 11 |
| OPKafkaStreams_kt.txt | 1,473 | 2019 Jul. 11 |
| OptimisticLockException_kt.txt | 443 | 2019 Jan. 15 |
| OptimisticLockTest_kt.txt | 13,768 | 2019 Jul. 25 |
| package-info_md.txt | 1,529 | 2019 Jan. 15 |
| PayloadPassthruProvisioner_kt.txt | 1,053 | 2019 Jul. 22 |
| PayloadRetrySharedConfigurationTest_kt.txt | 6,898 | 2019 Jul. 22 |
| PayloadRetrySharedConfiguration_kt.txt | 3,008 | 2019 Jul. 11 |
| PayloadRetrySharedTest_kt.txt | 7,335 | 2019 Jul. 25 |
| PayloadRetryShared_kt.txt | 7,561 | 2019 Dec. 31 |
| PayloadRetryTestProvisioner_kt.txt | 1,259 | 2019 Jul. 22 |
| PersistentAndPayloadRetryCohabitationTest_kt.txt | 8,813 | 2019 Jul. 25 |
| PersistentRetryMongoDbConfigurationTest_kt.txt | 7,078 | 2019 Jul. 22 |
| PersistentRetryMongoDbConfiguration_kt.txt | 3,159 | 2019 Jul. 11 |
| PersistentRetryMongoDbEmitterConfiguration_kt.txt | 560 | 2019 Jul. 11 |
| PersistentRetryMongoDbEmitter_kt.txt | 2,831 | 2019 Jul. 11 |
| PersistentRetryMongoDbPersisterTest_kt.txt | 5,376 | 2019 Jul. 22 |
| PersistentRetryMongoDbPreProcessorConfiguration_kt.txt | 1,021 | 2019 Jul. 11 |
| PersistentRetryMongoDbPreProcessorTest_kt.txt | 8,783 | 2019 Jul. 22 |
| PersistentRetryMongoDbPreProcessor_kt.txt | 2,126 | 2019 Jul. 11 |
| PersonNameDto_kt.txt | 359 | 2019 Jan. 15 |
| PhoneNumberDto_kt.txt | 818 | 2019 May 8 |
| PhoneNumberStatusDto_kt.txt | 532 | 2019 Jan. 15 |
| PostalAddressDto_kt.txt | 999 | 2019 Apr. 3 |
| POSTCommon_kt.txt | 7,402 | 2019 Jul. 11 |
| POSTEmitter_kt.txt | 1,837 | 2019 Jul. 22 |
| POSTTransformer_kt.txt | 2,745 | 2019 Jul. 11 |
| PractitionerCategoryDto_kt.txt | 164 | 2019 Jan. 15 |
| PractitionerDao_kt.txt | 216 | 2019 Jan. 15 |
| PractitionerDto_kt.txt | 1,547 | 2019 Jul. 11 |
| PractitionerRelationshipStatusDto_kt.txt | 588 | 2019 Jan. 15 |
| PractitionerTypeDto_kt.txt | 211 | 2019 Jan. 15 |
| PreferenceDto_kt.txt | 298 | 2019 Jan. 15 |
| PreferenceSetDto_kt.txt | 88 | 2019 Jan. 15 |
| Processor_kt.txt | 1,334 | 2019 Jul. 25 |
| PropertyUtils_kt.txt | 32,633 | 2019 Jul. 22 |
| pub-create-agencyIdentifier_bat.txt | 343 | 2018 Aug. 4 |
| pub-create-deaAuthorizations_bat.txt | 351 | 2018 Aug. 4 |
| PUTCommon_kt.txt | 8,869 | 2019 Jul. 11 |
| PUTEmitter_kt.txt | 2,351 | 2019 Jul. 22 |
| PUTIntegrationTest_kt.txt | 30,376 | 2019 Jul. 25 |
| PUTPostProvisionProcessorConfiguration_kt.txt | 1,224 | 2019 Jul. 22 |
| PUTPostProvisionProcessor_kt.txt | 1,500 | 2019 Jul. 11 |
| PUTTransformer_kt.txt | 1,482 | 2019 Jul. 11 |
| README.txt | 1,811 | 2018 Aug. 4 |
| RelatedPractitionerDto_kt.txt | 734 | 2019 Apr. 3 |
| RenameTargetFieldPostProcessorConfigurationTest_kt.txt | 2,427 | 2019 Jul. 22 |
| RenameTargetFieldPostProcessorConfiguration_kt.txt | 1,005 | 2019 Jul. 11 |
| RenameTargetFieldPostProcessorTest_kt.txt | 4,494 | 2019 Jul. 22 |
| RenameTargetFieldPostProcessor_kt.txt | 1,239 | 2019 Jul. 11 |
| run-kafka_bat.txt | 342 | 2018 Aug. 4 |
| Section_kt.txt | 1,228 | 2019 Jul. 25 |

-continued

| NAME | SIZE (BYTES) | CREATION DATE |
|---|---|---|
| SecureKafkaStreamsConsumerConfig_kt.txt | 6,008 | 2019 May 1 |
| ShuttingDownException_kt.txt | 544 | 2019 Jan. 15 |
| Specification_kt.txt | 1,346 | 2019 Jul. 25 |
| SpringGlue_kt.txt | 303 | 2019 Jan. 15 |
| StateDto_kt.txt | 186 | 2019 Jan. 15 |
| StatusDto_kt.txt | 2,881 | 2019 Apr. 3 |
| StoreKeySetPostProvisionProcessorConfigurationTest_kt.txt | 15,635 | 2019 Jul. 22 |
| StoreKeySetPostProvisionProcessorConfiguration_kt.txt | 5,796 | 2019 Jul. 22 |
| StoreKeySetPostProvisionProcessorTest_kt.txt | 55,812 | 2019 Jul. 22 |
| StoreKeySetPostProvisionProcessor_kt.txt | 16,066 | 2019 Jul. 22 |
| SystemPropertiesSharedConfigurationTest_kt.txt | 2,496 | 2019 Jul. 22 |
| SystemPropertiesSharedConfiguration_kt.txt | 1,638 | 2019 Jul. 11 |
| SystemPropertiesSharedTest_kt.txt | 2,429 | 2019 Jul. 22 |
| SystemPropertiesShared_kt.txt | 873 | 2019 Jul. 11 |
| TaxonomyCodeDto_kt.txt | 749 | 2019 Jul. 11 |
| TemporaryContactMechanismDto_kt.txt | 219 | 2019 Jan. 15 |
| TestTopicDriver_kt.txt | 4,270 | 2019 Jul. 22 |
| TestTopic_kt.txt | 5,221 | 2019 Jul. 22 |
| ThrowExceptionProcessorConfiguration_kt.txt | 1,784 | 2019 Jul. 11 |
| ThrowExceptionProcessorTest_kt.txt | 2,804 | 2019 Jul. 22 |
| ThrowExceptionProcessor_kt.txt | 3,181 | 2019 Jul. 11 |
| TopicStaging_kt.txt | 4,399 | 2019 Jul. 22 |
| UnreachableContactMechanismDto_kt.txt | 217 | 2019 Jan. 15 |
| UnrecognizedOperationException_kt.txt | 447 | 2019 Jan. 15 |
| UnSecureKafkaStreamsConsumerConfig_kt.txt | 1,726 | 2019 Apr. 16 |
| UpperCasePostProcessorTest_kt.txt | 4,375 | 2019 Jul. 22 |
| UpperCasePostProcessor_kt.txt | 1,197 | 2019 Jul. 11 |
| UrlConnectionSubConfiguration_kt.txt | 3,785 | 2019 Jul. 22 |
| Utils_kt.txt | 654 | 2019 Jul. 25 |
| UuidApplicatorConfigurationDSL_kt.txt | 1,791 | 2019 Jul. 25 |
| UuidApplicatorConfiguration_kt.txt | 2,849 | 2019 Jul. 11 |
| UuidApplicatorTest_kt.txt | 5,909 | 2019 Jul. 22 |
| UuidApplicator_kt.txt | 2,329 | 2019 Jul. 22 |
| ValidationException_kt.txt | 428 | 2019 Jan. 15 |
| ValueOption_kt.txt | 192 | 2019 Jan. 15 |
| ValuesMapPostProcessorConfiguration_kt.txt | 1,360 | 2019 Jul. 11 |
| ValuesMapPostProcessorTest_kt.txt | 3,165 | 2019 Jul. 22 |
| ValuesMapPostProcessor_kt.txt | 1,383 | 2019 Jul. 11 |
| VerificationStatusDto_kt.txt | 507 | 2019 Jan. 15 |
| WasChangedValidator_kt.txt | 1,318 | 2019 Jul. 11 |

FIELD

The present disclosure relates to software development and deployment and more particularly to a scalable software architecture for software development and flexible deployment.

BACKGROUND

In many industries, technology has become a key differentiator. Many technological advances rely on software and therefore software development has become a central aspect of many businesses. Unfortunately, good programming principles are not taught in schools and are difficult to learn and to follow consistently. In many programming teams, preferred development practices are conveyed in top-down policies, not organically created by the software architecture. This leads to sub-optimal code that takes longer to write, is harder to maintain, is less flexible, and contains more latent errors.

SUMMARY

A non-transitory computer-readable medium stores instructions executable by processor hardware. The instructions include executing a first application. The instructions include, in response to a first configuration specification, configuring a first choreographer of the first application. The first choreographer requires at least one collector and at least one emitter and defines a sequence of processing stages. The first configuration specification specifies which of a set of available collectors will be the at least one collector. The first configuration specification specifies which of a set of available emitters will be the at least one emitter. The first configuration specification specifies, for each stage of the sequence of processing stages, which set of processors from a set of available processors will be invoked for the stage. The instructions include, for each stage of the sequence of processing stages, initiating the set of processors for the stage. The instructions include initiating each of the at least one emitter to provide outputs from a final stage of the sequence of processing stages. The instructions include, subsequent to initiating the processors and the at least one emitter, initiating each of the at least one collector to acquire input for passage to an initial stage of the sequence of processing stages. The instructions include, in response to a reconfiguration request for the first application, pausing each of the at least one collector; subsequent to pausing the at least one collector, pausing each stage of the sequence of processing stages; subsequent to pausing the processors, pausing each of the at least one emitter; and subsequent to pausing the at least one emitter, configuring the first choreographer according to a second configuration specification.

In other features, the set of available processors includes a no-op processor that performs no operation. The no-op processor can be invoked from any of the sequence of processing stages. In other features, the set of available processors includes an exception processor that throws an exception for debugging purposes. The exception processor can be invoked from any of the sequence of processing stages.

In other features, the set of available collectors includes a representational state transfer (REST) collector configured to receive a hypertext transfer protocol (HTTP) GET request. The set of available emitters includes a REST emitter configured to transmit an HTTP response message. In other features, the set of available collectors includes a publish-subscribe collector configured to receive messages from a publish-subscribe messaging system. The set of available emitters includes a publish-subscribe emitter configured to publish messages to the publish-subscribe messaging system. In other features, the publish-subscribe messaging system is implemented by an Apache Kafka distributed streaming platform.

In other features, the set of available collectors includes at least one of (i) a structured query language (SQL) database collector for an SQL database and (ii) a NoSQL database collector for a particular NoSQL database. The set of available emitters includes at least one of (i) an SQL database emitter and (ii) a NoSQL database emitter for the particular NoSQL database. In other features, the set of available collectors includes at least one of a command line interface (CLI) collector configured to receive parameters specified in a command line used to launch the first application and a pipe collector configured to receive data supplied to the first application by an operating system pipe implemented by an operating system executing the first application.

In other features, the instructions further comprise generating a graphical user interface that displays, to a developer, names and metadata for a set of available choreographers including the first choreographer, at least some of the set of available collectors, at least some of the set of available emitters, and at least some of the set of available processors. The graphical user interface constructs a configuration specification based on selection by the developer of one of the set of available choreographers, at least one of the set of available collectors, and at least one of the set of available emitters.

In other features, the first choreographer is at least one of a choreographer that defines the sequence of processing stages to facilitate transformation of data from a first format to a second format and a choreographer that defines the sequence of processing stages to facilitate processing and responding to queries. In other features, the first format is a record from a structured query language (SQL) database and the second format is a document to be written to a NoSQL database. In other features, the first format is extensible markup language (XML) and the second format is JavaScript Object Notation (JSON).

A computer-implemented method includes executing a first application. The method includes, in response to a first configuration specification, configuring a first choreographer of the first application. The first choreographer requires at least one collector and at least one emitter and defines a sequence of processing stages. The first configuration specification specifies which of a set of available collectors will be the at least one collector. The first configuration specification specifies which of a set of available emitters will be the at least one emitter. The first configuration specification specifies, for each stage of the sequence of processing stages, which set of processors from a set of available processors will be invoked for the stage. The method includes, for each stage of the sequence of processing stages, initiating the set of processors for the stage. The method includes initiating each of the at least one emitter to provide outputs from a final stage of the sequence of processing stages. The method includes, subsequent to initiating the processors and the at least one emitter, initiating each of the at least one collector to acquire input for passage to an initial stage of the sequence of processing stages.

The method includes, in response to a reconfiguration request for the first application, pausing each of the at least one collector; subsequent to pausing the at least one collector, pausing each stage of the sequence of processing stages; subsequent to pausing the processors, pausing each of the at least one emitter; and subsequent to pausing the at least one emitter, configuring the first choreographer according to a second configuration specification. In other features, the set of available collectors includes a representational state transfer (REST) collector configured to receive a hypertext transfer protocol (HTTP) GET request and the set of available emitters includes a REST emitter configured to transmit an HTTP response message. In other features, the set of available collectors includes a publish-subscribe collector configured to receive messages from a publish-subscribe messaging system. The set of available emitters includes a publish-subscribe emitter configured to publish messages to the publish-subscribe messaging system.

In other features, the set of available collectors includes at least one of (i) a structured query language (SQL) database collector for an SQL database and (ii) a NoSQL database collector for a particular NoSQL database. The set of available emitters includes at least one of (i) an SQL database emitter and (ii) a NoSQL database emitter for the particular NoSQL database. In other features, the set of available collectors includes at least one of a command line interface (CLI) collector configured to receive parameters specified in a command line used to launch the first application and a pipe collector configured to receive data supplied to the first application by an operating system pipe implemented by an operating system executing the first application.

In other features, the method includes generating a graphical user interface that displays, to a developer, names and metadata for a set of available choreographers including the first choreographer, at least some of the set of available collectors, at least some of the set of available emitters, and at least some of the set of available processors. The graphical user interface constructs a configuration specification based on selection by the developer of one of the set of available choreographers, at least one of the set of available collectors, and at least one of the set of available emitters. In other features, the first choreographer is at least one of a choreographer that defines the sequence of processing stages to facilitate transformation of data from a first format to a second format and a choreographer that defines the sequence of processing stages to facilitate processing and responding to queries.

A system includes memory hardware configured to store instructions and processing hardware configured to execute the instructions stored by the memory hardware. The instructions include executing a first application in response to a first configuration specification. The instructions include configuring a first choreographer of the first application. The first choreographer requires at least one collector and at least one emitter and defines a sequence of processing stages. The first configuration specification specifies which of a set of available collectors will be the at least one collector. The first configuration specification specifies which of a set of available emitters will be the at least one emitter. The first configuration specification specifies, for each stage of the sequence of processing stages, which set of processors from a set of available processors will be invoked for the stage. The instructions include, for each stage of the sequence of processing stages, initiating the set of processors for the stage. The instructions include initiating each of the at least one emitter to provide outputs from a final stage of the sequence of processing stages. The instructions include, subsequent to initiating the processors and the at least one emitter, initiating each of the at least one collector to acquire input for passage to an initial stage of the sequence of processing stages. The instructions include, in response to a reconfiguration request for the first application: pausing each of the at least one collector; subsequent to pausing the at least one collector, pausing each stage of the sequence of processing stages; subsequent to pausing the processors, pausing each of the at least one emitter; and subsequent to pausing the at least one emitter, configuring the first choreographer according to a second configuration specification.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 10 is a graphical representation of execution of a component according to the principles of the present disclosure.

FIG. 11 is a graphical representation of reconfiguration of a component according to the principles of the present disclosure.

In the drawings, reference numbers may be reused to identify similar and/or identical elements.

DETAILED DESCRIPTION

Introduction

While software development principles and techniques that lead to efficient, scalable, maintainable, and easily deployable code have been studied for decades, modern software development typically falls short on many of these fronts. For example, developers in an organization frequently write the same code over and over again. Nearly as bad, developers frequently rely on copy and paste, an example of a design anti-pattern. Developers generally get stuck in silos and have little cross-organization communication. Top-down development decisions often lead to developers creating solutions for hypothetical problems rather than actual problems.

The present disclosure addresses these problems not by promulgating rules and guidelines, but by defining an architecture that organically promotes beneficial design patterns and code reuse. The architecture allows code to be written once and used widely. This abates the copy-paste anti-pattern. Reusable code allows developers to communicate with each other, preventing the creation of silos and allowing developers to migrate to where their talents are needed. In other words, an experienced and skilled developer can work on a project where that experience is necessary rather than remaining within a project that could be maintained by a less-experienced developer simply because the developers are knowledgeable only about their own silos.

New developers can quickly come up to speed on the extensible and reusable framework, beginning with combining components to create modules solutions to business problems—and progressing to developing their own components. Problems encountered when attempting to solve a business problem can be addressed immediately rather than attempting to predict all future business problems. As one example only, consider a component that needs to write a first type of record to a NoSQL database. Instead of creating a component that attempts to encompass every current and future interaction with the NoSQL database, a component can be developed that specifically permits writing the first type of record to the NoSQL database. If a second type of record needs to be written to that same NoSQL database, a second component can be created to perform that second task. Later, the two components may be refactored into a single component that can write both types of records to the NoSQL database.

Figure 4:
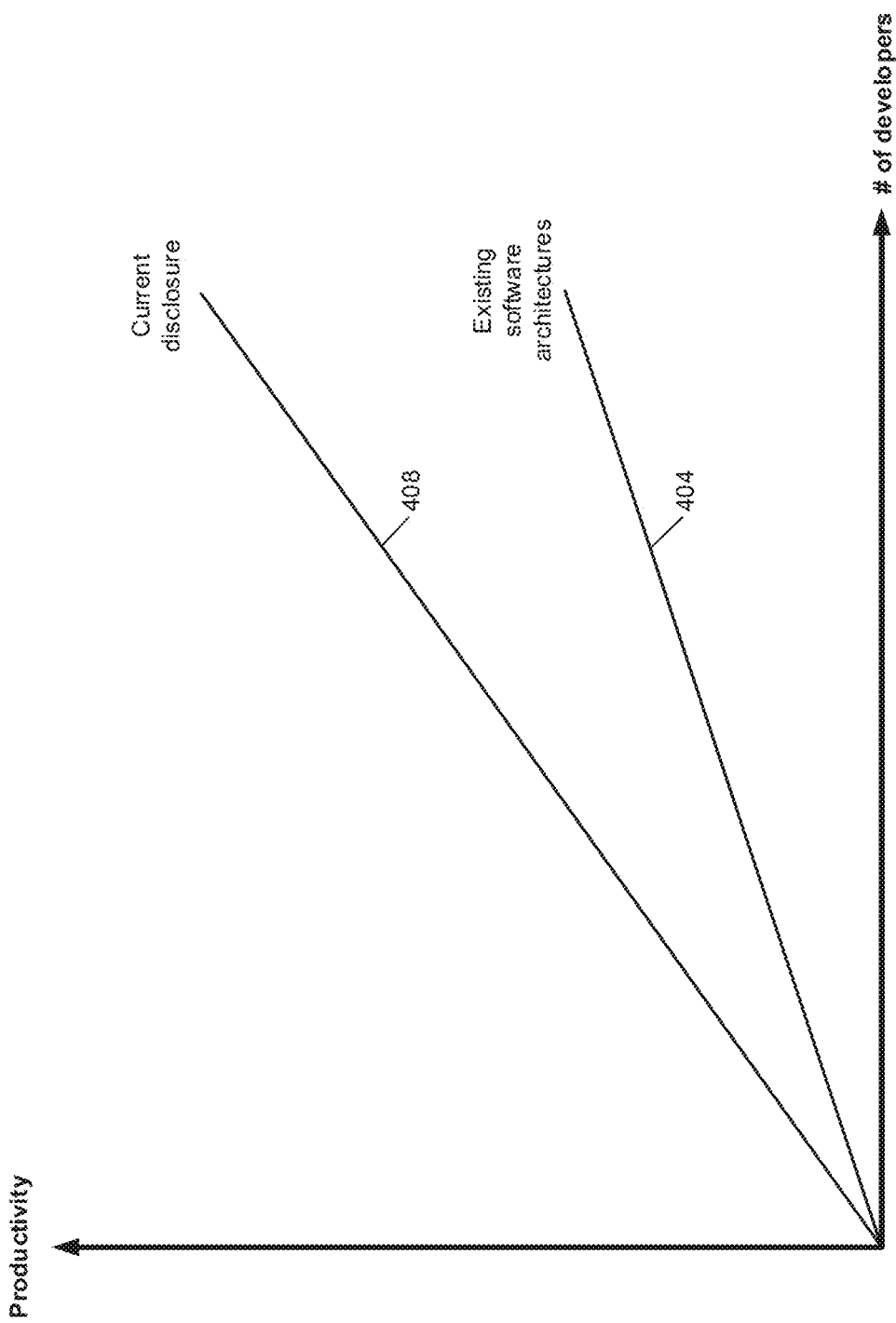
FIG. 4 is a plot of example productivity scaling as a comparison between the current disclosure and existing software architectures.

As seen in FIG. 4, the observed productivity of a group of developers increases as the number of developers increases, as represented by line 404. However, productivity increases at less than a 1:1 ratio to the number of developers. In fact, while a line is shown for illustration purposes, actual realized productivity may even bend down such that as more and more developers are added to the productivity increases at less than the initial linear rate.

Meanwhile, an architecture according to the current disclosure is represented by line 408. As shown in FIG. 4, the expected, and anecdotally observed, productivity boosts from the present architecture scales approaching 1:1 or even greater with the number of developers. In fact, akin to the benefits of open source, productivity may even increase at a faster than linear rate.

The architecture according to the present disclosure defines a minimalist main program that loads a specified choreographer and configures the choreographer using a configuration according to a configuration specification. The main routine may be implemented as a small executable that is compiled for a particular processor architecture or as a Java executable. In various implementations, the choreographer may be implemented as a library.

When deploying the current architecture, each individual application may be thought of as a microservice. Each application may include one choreographer and may be spun up by a virtual machine manager or a container manager, such as the Kubernetes manager or the Docker Swarm manager, without a particular configuration specification.

Then, as the application is needed, a configuration specification can be supplied and the application can then begin processing data according to the specification. This allows for incredibly quick scaling because the application is already running and simply needs to read a new configuration specification. Each application can also be reconfigured according to a different configuration specification as the needs of the system change. In various implementations, multiple choreographer libraries can be loaded with the application and therefore even the choreographer that is used can be reconfigured within a running application. As a result of the reconfigurable configuration approach, systems according to the present disclosure can exhibit decreased latency in responding to changes in demand than existing systems.

Each choreographer defines a set of processing stages as well as at least one collector and at least one emitter. A collector receives inputs, such as requests or data in a first format. An emitter generates outputs, such as responses, data in a second format, log messages, and status updates. One example choreographer is described below with respect to FIG. 9. A module is a configuration and choreographer combination created for the purpose of performing a business function, such as converting data from a structured query language (SQL) database to a NoSQL data store.

A choreographer is a declaration of steps generally needed to process input from a particular collector. Components are assigned, according to the configuration specification, to each of the choreographer's steps, which creates a complete module. A component is a small piece of code that implements a choreographer interface and performs one task. A configuration specification is a data file that specifies which components are used with which choreographer steps. As such, configuration specifications are declarative.

Figure 5:
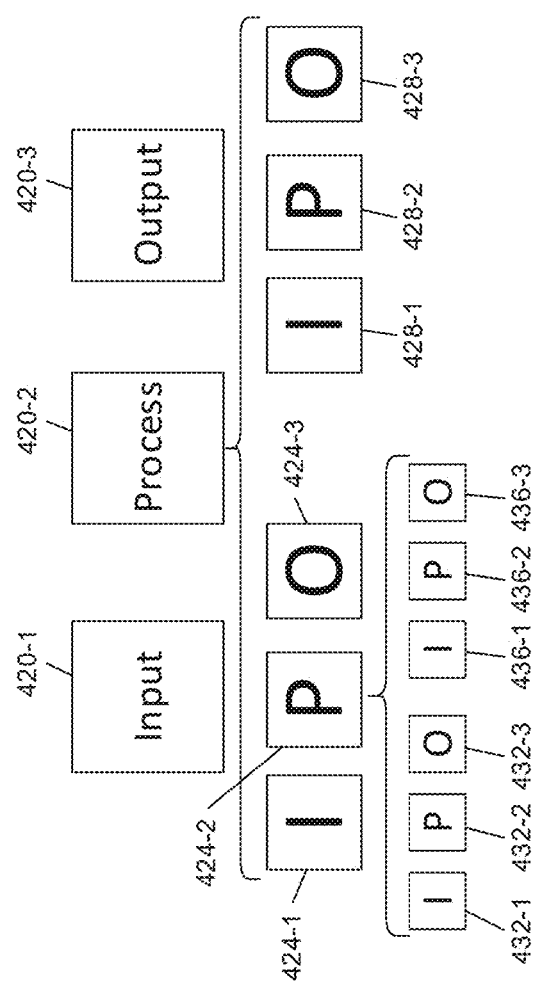
FIG. 5 is a graphical representation of a recursive architecture facilitated by the principles of the present disclosure.

Because a choreographer has a collector, a pipeline of processing stages, and an emitter, the choreographer follows an input-process-output (IPO) model as depicted in FIG. 5. In FIG. 5, data received by input 420-1 is processed by process pipeline 420-2 and the result is outputted by output 420-3. The process pipeline 420-2 is implemented by one or more stages that each follow the same IPO pattern.

For example, the process pipeline 420-2 may itself call two IPO structures, where an input 424-1 receives data from a component of the process pipeline 420-2, which is then processed by a process pipeline 424-2 and provided to output 424-3. The output 424-3 is received by the process pipeline 420-2 and may be directly provided to an input 428-1. Alternatively, another component of the process pipeline 420-2 may provide data to the input 428-1. A process pipeline 428-2 processes data received by the input 428-1. The result is then provided by the output 428-3 to the process pipeline 420-2, which may directly or indirectly provide the result to the output 420-3.

The process pipeline 424-2 itself calls two IPO structures in this illustration. The first structure includes an input 432-1 that provides data to a process pipeline 432-2, which generates data to be provided by the output 432-3. The process pipeline 424-2 may then provide that data to an input 436-1 of another IPO structure or may call the input 436-1 separately. A process pipeline 436-2 processes data from the input 436-1 and provides an output through the output 436-3 back to the process pipeline 424-2.

High-Volume Pharmacy

Figure 1:
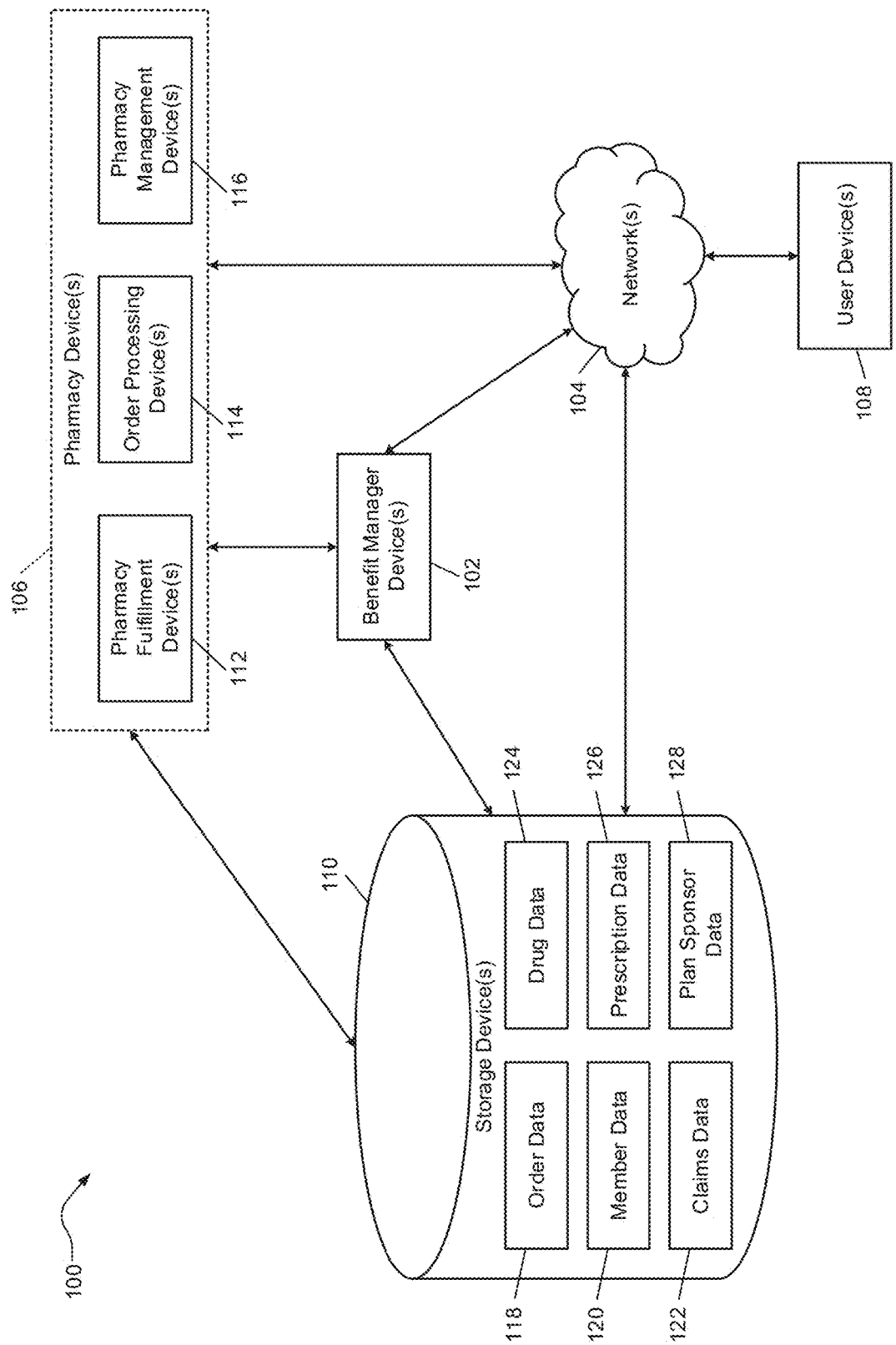
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug.

The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Va.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
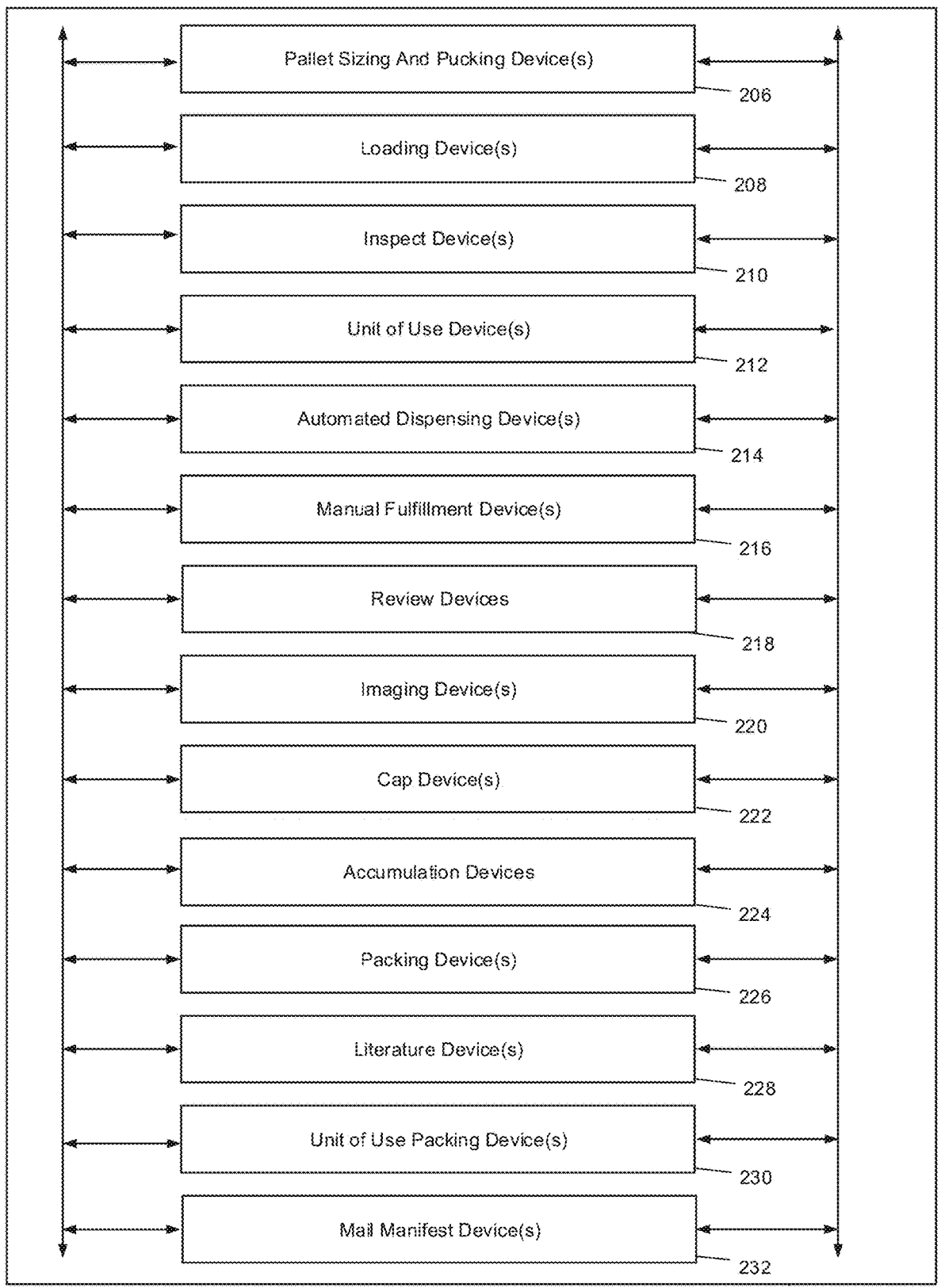
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
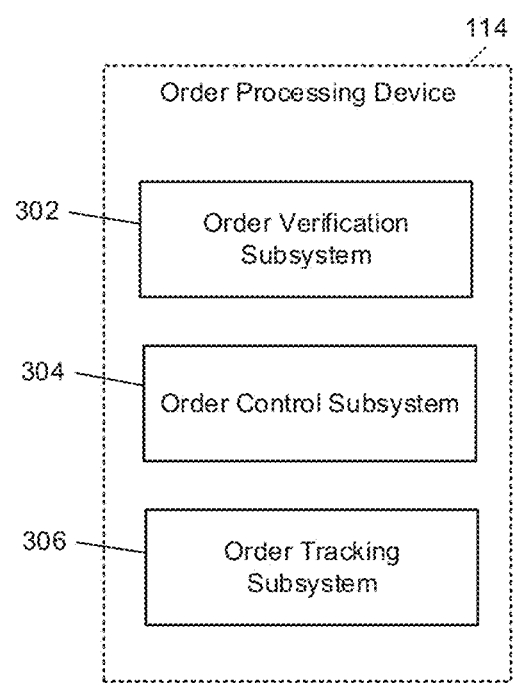
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Architecture

Figure 6:
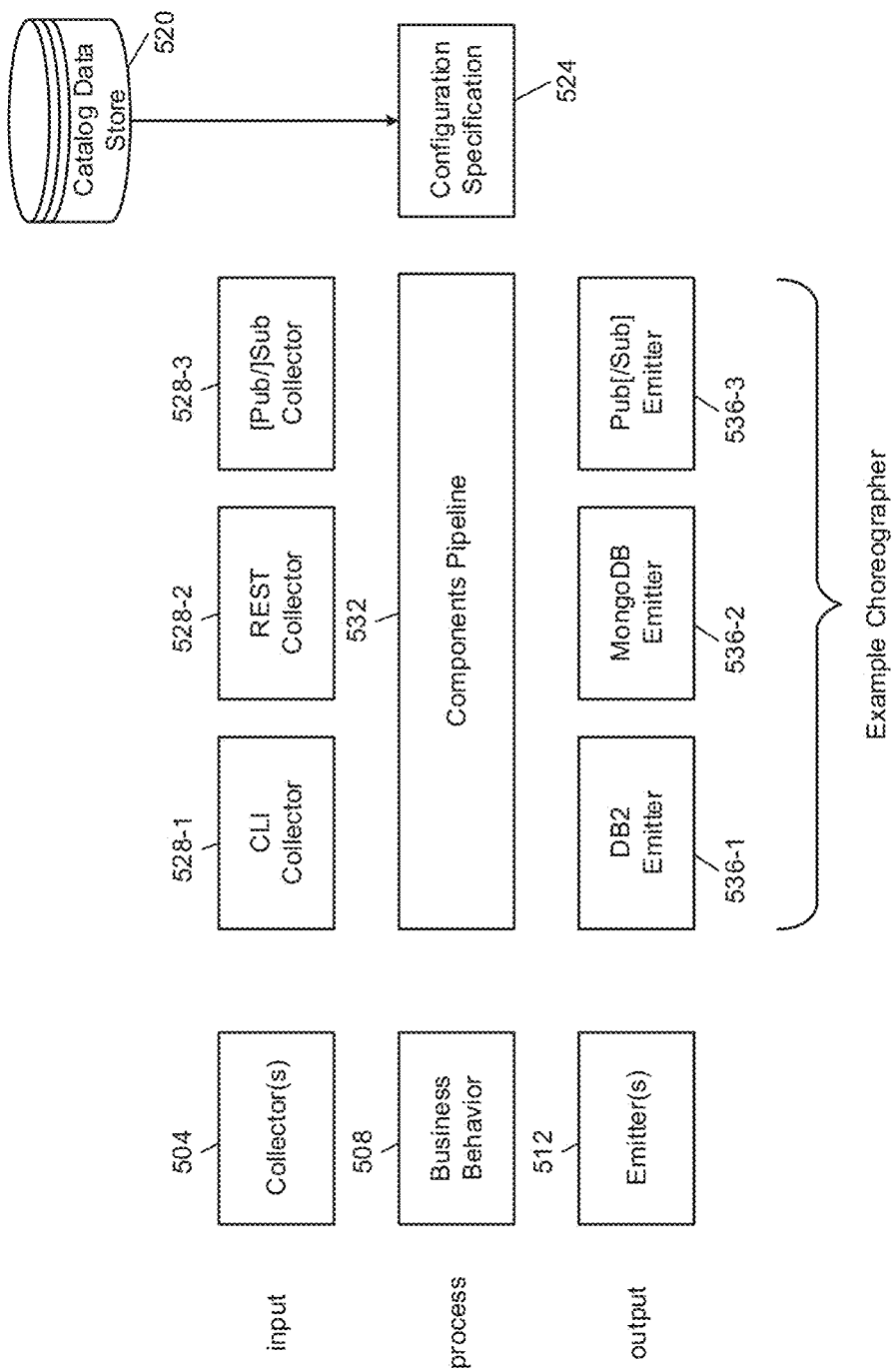
FIG. 6 is a graphical representation of example components of a software architecture according to the principles of the present disclosure.

FIG. 6 shows a graphical representation of an example structure of a choreographer. One or more collectors 504 act as asynchronous data inputs. A processing pipeline is shown as business behavior 508. One or more emitters 512 provides outputs based on the business behavior 508. A catalog data store 520 defines the collectors 504, the emitters 512, and components used for the business behavior 508. A configuration specification 524 may be thought of as a program and the choreographer as a virtual machine since the configuration specification 524 defines which collectors, emitters, and components will be used in a choreographer.

As examples only, a command line interface (CLI) collector 528-1 may be defined. Further, a representational state transfer (REST) application programming interface (API) collector 528-2 may be defined. In addition, a publish/subscribe (pub/sub) collector 528-3 may be defined. The CLI collector 528-1, the REST API collector 528-2, and the pub/sub collector 528-3 may be collectively referred to as collectors 528.

In one example, the pub/sub collector 528-3 may only implement the subscription portion of the pub/sub model. Specifically, the pub/sub collector 528-3 may implement a Kafka listener for a single (configurable) topic. Data from any of the collectors 528 is provided to a components pipeline 532. In various implementations, adapter patterns may intermediate between the collectors 528 and the components pipeline 532 so that the collectors 528 do not have to all offer the exact same interface to the components pipeline 532.

Example emitters for the choreographer are shown and include a DB2 emitter 536-1 for DB2 relational databases, a MongoDB emitter 536-2 for MongoDB NoSQL databases, and a pub/sub emitter 536-3. In various implementations, the pub/sub emitter 536-3 only implements publish functionality. As one example only, the configuration specification 524 may specify that the DB2 emitter 536-1 will output a result of the components pipeline 532 to a mainframe database while a new record will be added to a MongoDB database via the MongoDB emitter 536-2 and a blog entry will be published via the pub/sub emitter 536-3. The emitters may operate asynchronously and may therefore emit data by the respective mechanisms simultaneously.

An executable, which may be run from a command line, may include a single function (which may be referred to as "main") that simply loads a specified choreographer. The choreographer may be specified to the executable by a command-line argument. The main class implements an application interface.

Instead of being run from a command line, the executable may be stored in a Jenkins job or a Git repository and may be run by a container manager, such as Kubernetes or Docker Swarm. The executable may be a single class with a single method called main and specifies a choreographer, a configuration, and a choreographer configuration specification (or, configuration specification). The configuration converts the configuration specification into something usable by the choreographer. The configuration shields the choreographer from the nuances of the configuration specification. The configuration specification may be a YAML (a recursive acronym for "YAML Ain't Markup Language") file or a domain specific language (DSL), which may be implemented in the Kotlin programming language.

Every component available to the components pipeline 532 may be referred to as a processor and implement the processor interface. The choreographer interface may require that every choreographer implements the following functions; startup, shutdown, run, and pause. When a choreographer makes a call to an interface, it doesn't know or need to know that the interface is implemented by a simple component or by an entirely different choreographer pipeline. In other words, the collector for such a choreographer pipeline could be a call-stack collector so that the input is received from a call stack rather than from an external source.

For illustration only, a partial example implementation of the principles of the present disclosure is shown in the computer program listing appendix.

Figure 7:
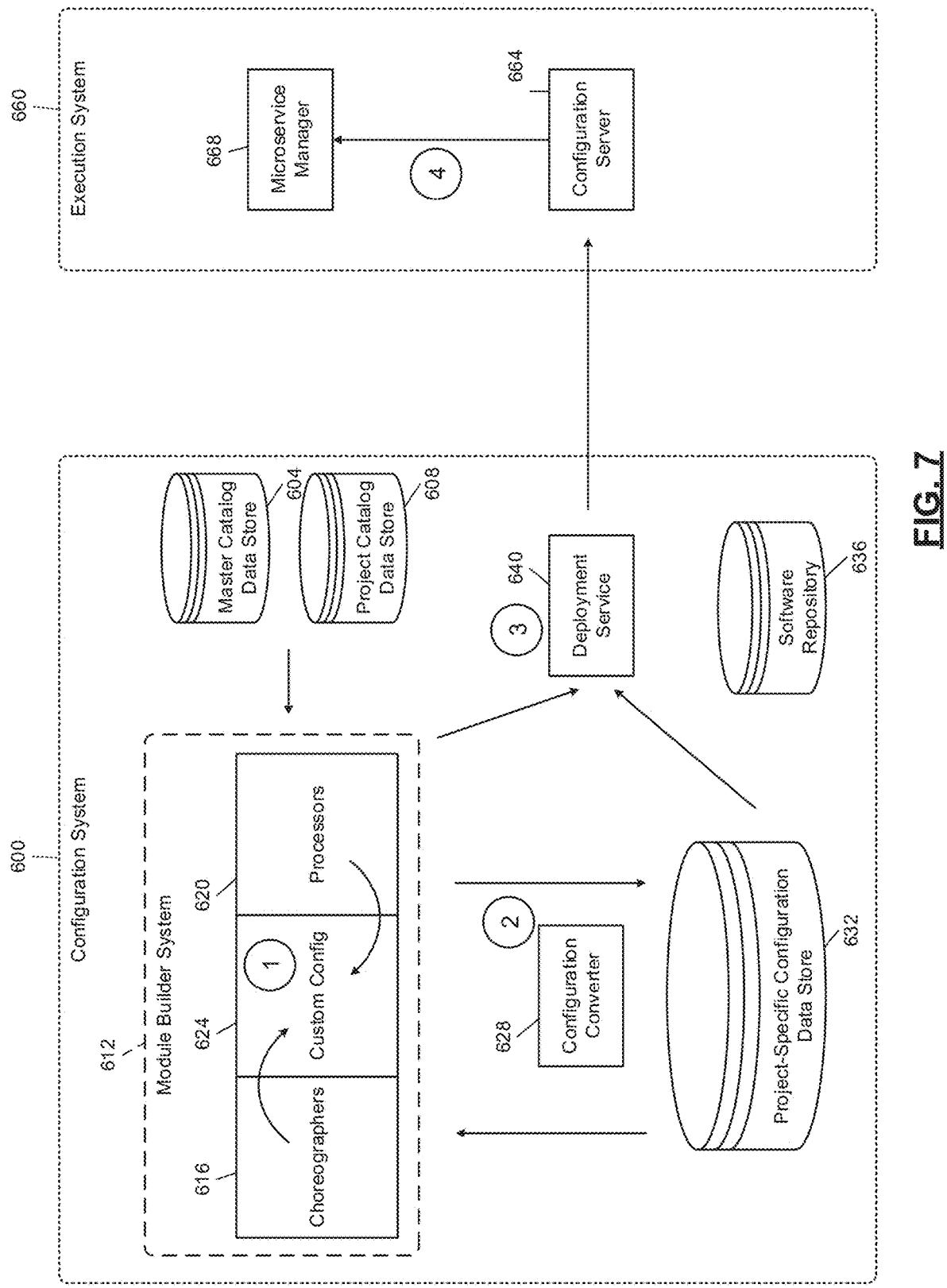
FIG. 7 is a functional block diagram of example development and deployment according to the principles of the present disclosure.

In FIG. 7, a functional block diagram of an example configuration system 600 includes a master catalog data store 604, which is a data store of metadata describing choreographers, processor components, collectors, and emitters of general applicability. A project catalog data store 608 may supplement the master catalog data store 604 for items that are project-specific and not suitable for organization-wide distribution.

A module builder system 612 includes a graphical user interface that allows a developer to choose a choreographer 616 and one or more processors 620 to generate a custom configuration specification 624. The developer can make decisions based on metadata stored by the master catalog data store 604 and the project catalog data store 608. A configuration converter 628 stores the selections in a project-specific configuration data store 632. A software repository 636, such as a Git repository or other version control system, stores the actual code for items available in the master catalog data store 604 and the project catalog data store 608.

A deployment service 640 provides, upon a command by a developer, a project-specific configuration to an execution system 660. Specifically, a configuration server 664 is configured to listen to the deployment service 640 and, in response, instantiate an application including a choreographer via a microservice manager 668. For a given choreographer, the microservice manager 668 may have one or more applications running at any given time. When a project-specific configuration is provided by the configuration server 664, the microservice manager 668 may configure or reconfigure one of the existing applications or spawn a new application. For example, the microservice manager 668 may manage containers, virtual machines, or applications running on a physical or virtualized application server.

Figure 8:
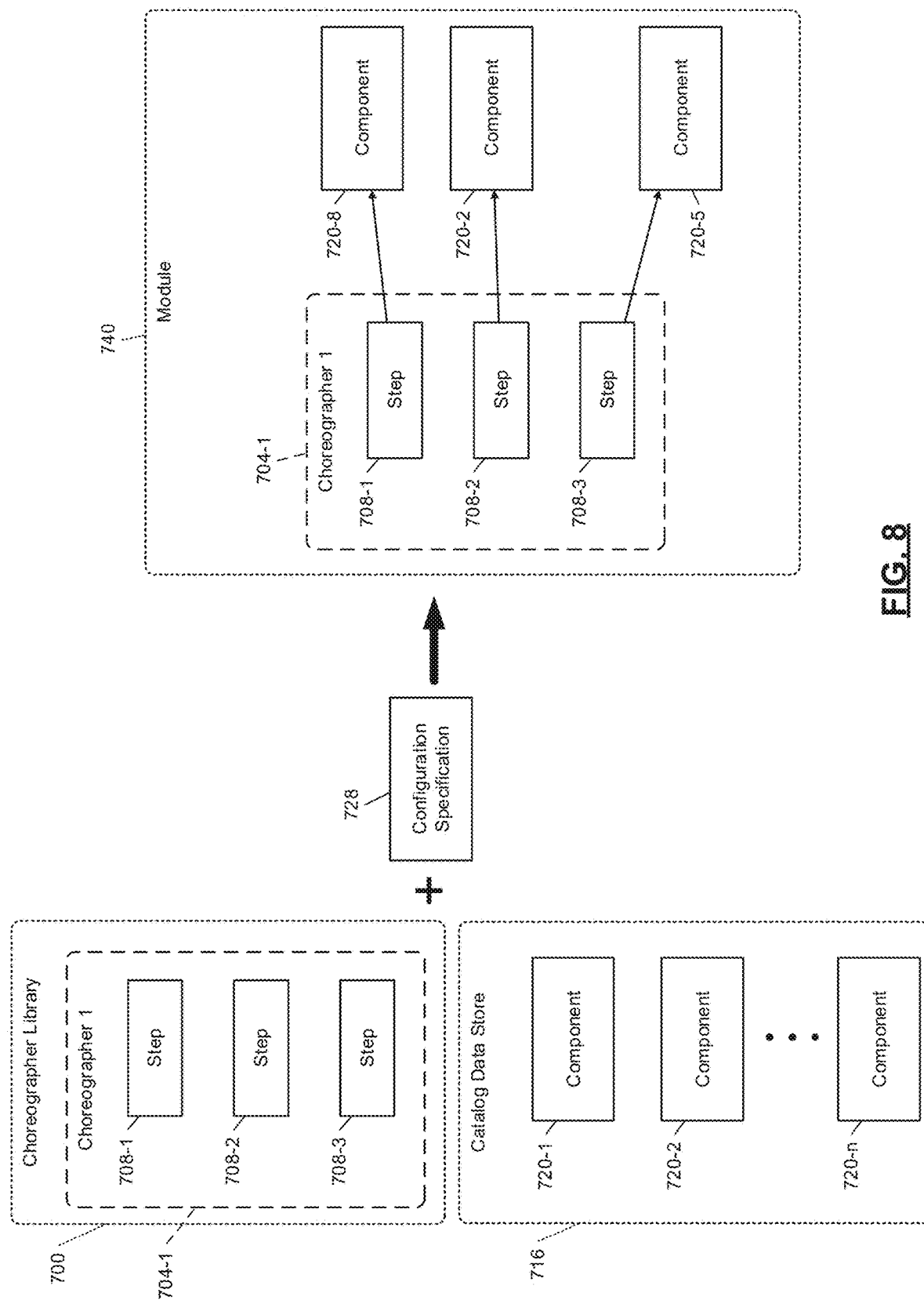
FIG. 8 is a graphical representation of module definition based on choreographer and configuration.

In FIG. 8, a graphical illustration of a project-specific configuration is depicted. A choreographer library 700 includes one or more choreographers, including a first choreographer 704-1. As an example only, the first choreographer 704-1 defines steps 708-1, 708-2, and 708-3. A catalog data store 716 defines multiple components 720-1, 720-2, . . . 720-n. In this example, a configuration specification 728 specifies the first choreographer 704-1 and assigns component 720-8 to step 708-1 of the first choreographer 704-1, assigns component 720-2 to step 708-2, and assigns component 720-5 to step 708-3. The resulting combination of the components 720 with the first choreographer 704-1 can be called a module (740).

Figure 9:
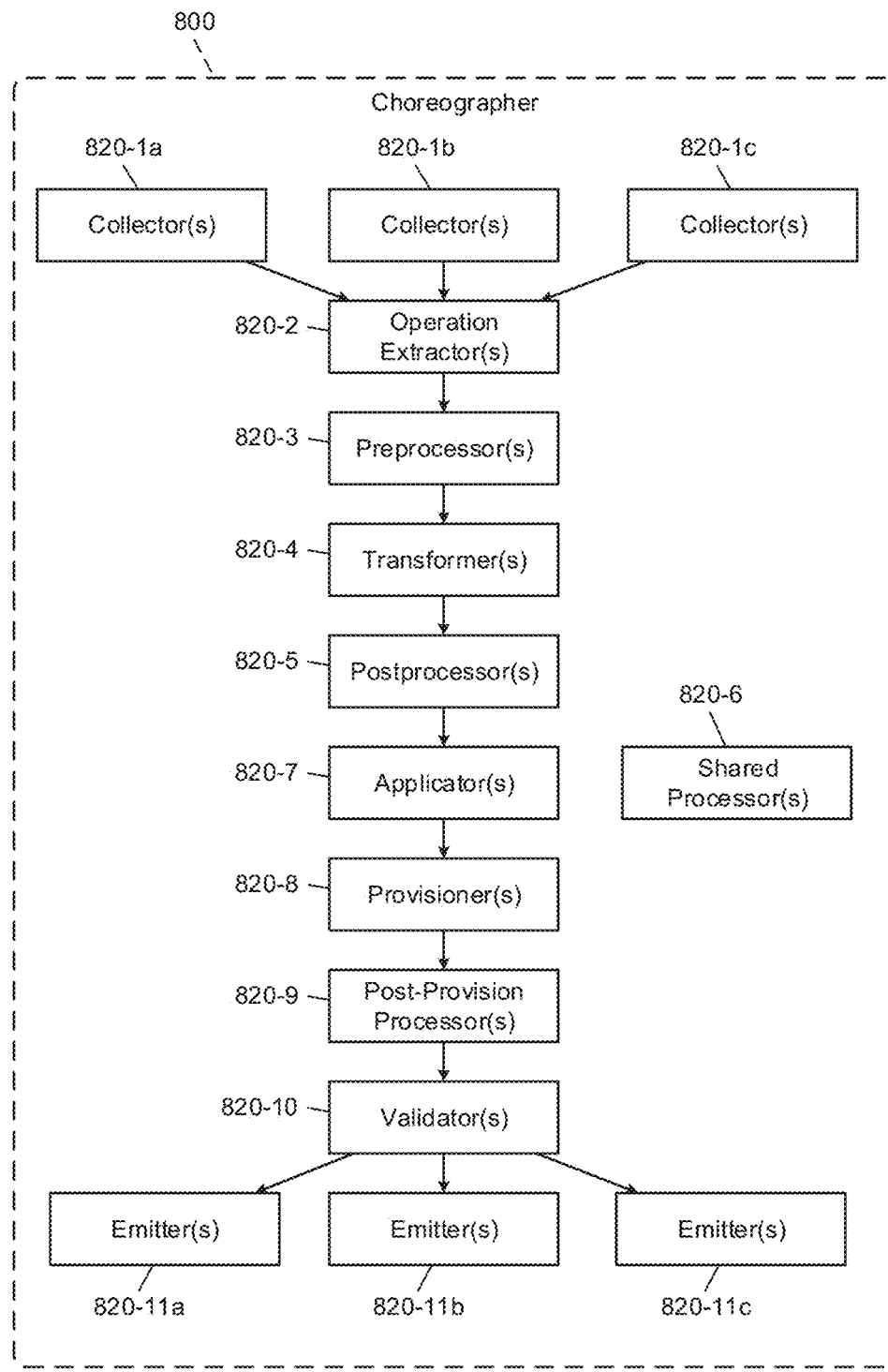
FIG. 9 is a functional block diagram of an example choreographer consistent with the principles of the present disclosure.

FIG. 9 is a graphical representation of an example choreographer 800 that can be used for transforming data, such as from a SQL database to a NoSQL data store. While the choreographer 800 is described as being used for transforming data, the choreographer 800 may have additional or alternative uses. Additional choreographers (not shown) include a choreographer for responding to hypertext transfer protocol (HTTP) methods, such as request methods including GET, POST, PUT, etc.

The choreographer 800, as with all choreographers according to the principles of the present disclosure, defines at least one collector. In FIG. 9, three collectors 820-1a, 820-1b, and 820-1c are shown as one example. While a choreographer is not required to specify any particular number of different components, the choreographer is required to specify at least one collector and at least one emitter. In other words, while the choreographer 800 specifies one or more component in the following processing stages, another choreographer could specify zero or more, two or more, etc. In less common instances, the choreographer may specify an exact number of components in a processing stage, such as one or two.

The choreographer 800 specifies one or more operation extractors 820-2. The operation extractors 820-2 may determine what operation is specified by the payload received from one of the collectors 820-1. For example, the payload may specify that the receive data represents a new data record while a different payload may specify that the received data represents an update to an existing record.

The choreographer 800 specifies one or more preprocessors 820-3. The choreographer 800 also specifies one or more transformers 820-4, one or more postprocessors 820-5, one or more shared processor is 820-6, one or more applicators 820-7, one or more provisioners 820-8, one or more post-provision processors 820-9, and one or more validators 820-10.

Each component available to the choreographer 800 may implement one or more processor interfaces. For situations in which the developer is creating a module for which one of the components is not needed, a no-op processor may be available. The no-op processor performs no operation and may implement all interfaces so that it can be called in any case in which the developer must supply a processor but doesn't need any operation to be performed. The no-op processor may also be used to isolate the behavior or a subset of processors for unit testing.

Similar to the no-op processor, an exception processor may also implement all interfaces so that it can be called in any situation. The exception processor may simply throw an exception for debugging purposes when called.

The choreographer 800, as with all choreographers, specifies one or more emitters 820-11. For illustration, three emitters, 820-11a, 820-11b, and 820-11c, are shown in FIG. 9.

FIG. 10 depicts example application functionality of an application core 840. The application core 840 is launched and then retrieves a specified configuration from a configuration server 844, which configures the application core 840 into a module that performs a specific task. The application core 840 advertises the availability of itself to a discovery server 848, which may act as a load balancer, instructing different requesters to use different application cores (including the application core 840). The application core 840 invokes one or more collectors to obtain data, invokes a specified processing pipeline, and then invokes one or more emitters to output data resulting from the processing pipeline.

In FIG. 11, reconfiguration of the application core 840 is shown. The application core 840 receives a reconfiguration command, such as from the microservice manager 668 of FIG. 7. The application core 840 pauses its collectors, retrieves the newly specified configuration from the configuration server 844, applies the new configuration, and then resumes the collectors. In various implementations, reconfiguration may require the pipeline to be flushed and the emitters paused prior to reconfiguration. In various implementations, reconfiguration may allow the choreographer, and not just the configuration specification, to be changed.

Flowcharts

Figure 12A:
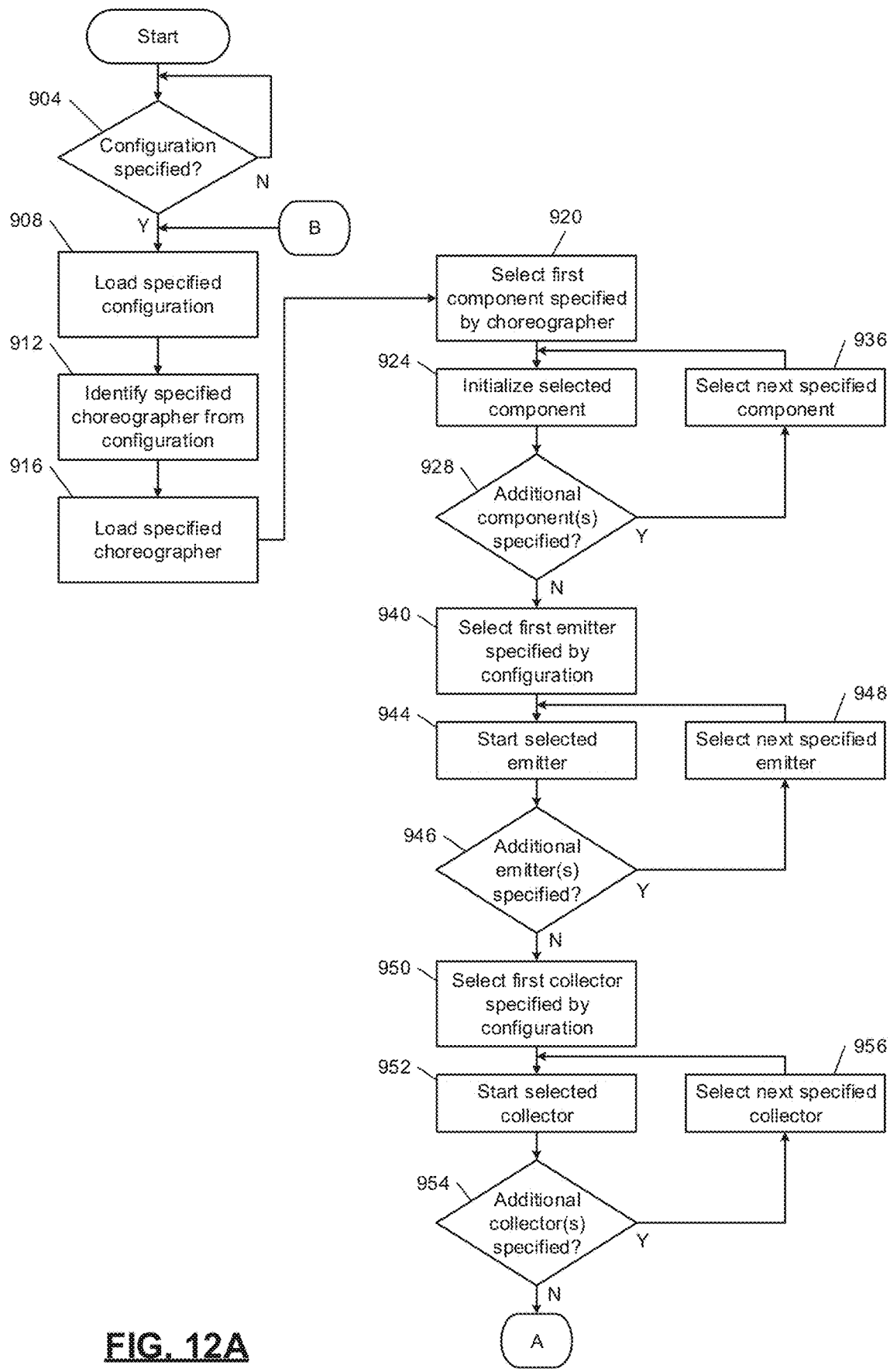
FIGS. 12A and 12B together form a flowchart of example operation of a component according to the principles of the present disclosure.

In FIG. 12A, control begins at 904, where control waits until a configuration is specified. Once a configuration is specified, control transfers to 908, where control loads the specified configuration. At 912, control identifies the choreographer specified by the configuration. At 916, control loads the specified choreographer, such as from a library.

At 920, control selects the first component specified by the choreographer according to the component identification provided by the configuration. At 924, control initializes the selected component. At 928, control determines whether the specification has specified additional components. If so, control transfers to 936; otherwise, control transfers to 940. At 936, control selects the next component specified by the specification and returns to 924.

At 940, control selects the first emitter specified by the configuration. At 944, control starts the selected emitter. At 946, control determines whether additional emitters are specified. If so, control transfers to 948; otherwise, control transfers to 950. At 948, control selects the next specified emitter and transfers to 944.

At 950, control selects the first collector specified by the configuration. At 952, control starts the selected collector. At 954, control determines whether any additional collectors are specified. If so, control transfers to 956; otherwise, control transfers to 958 of FIG. 12B. At 956, control selects the next specified collector and transfers to 952.

Figure 12B:
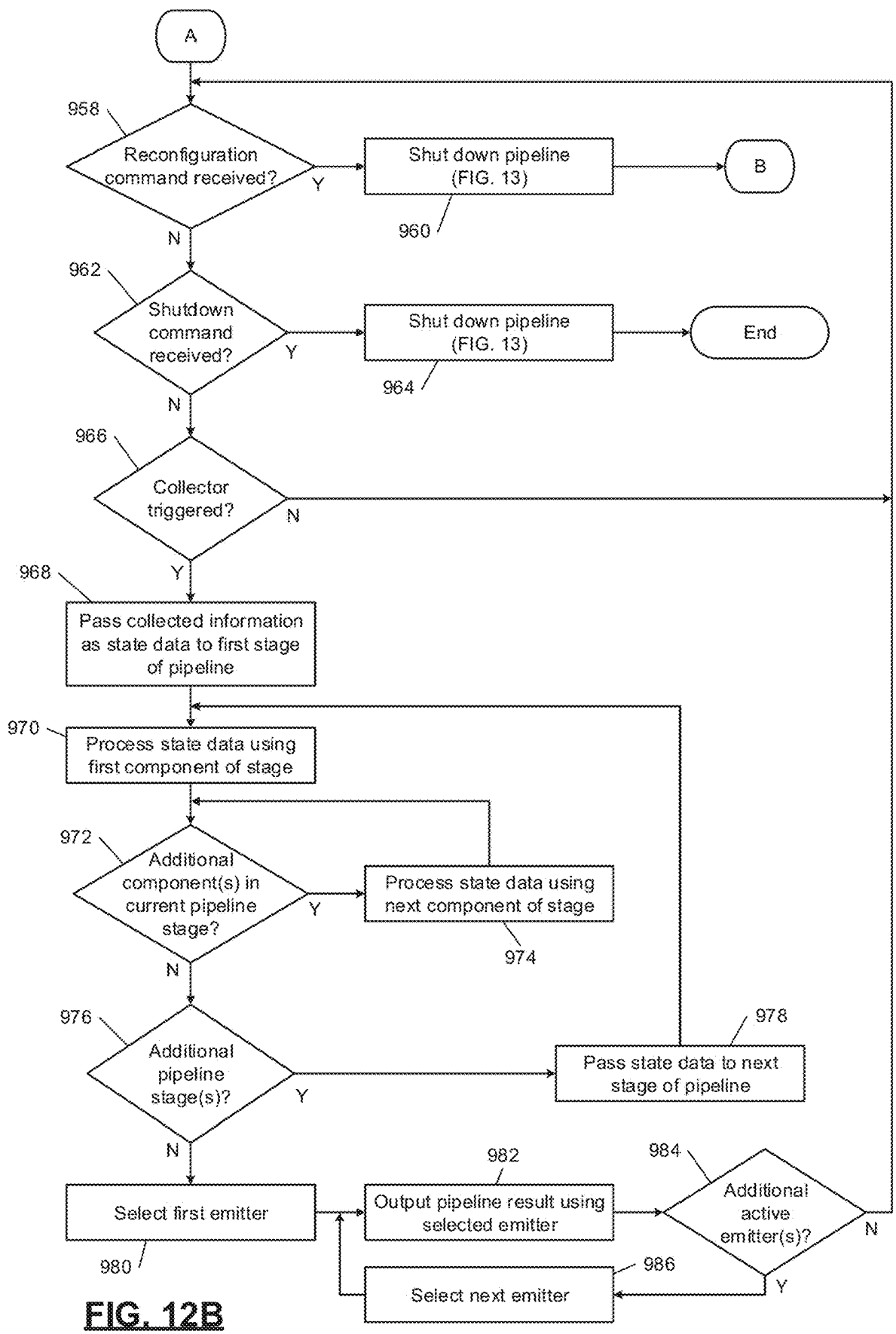
Figure 13:
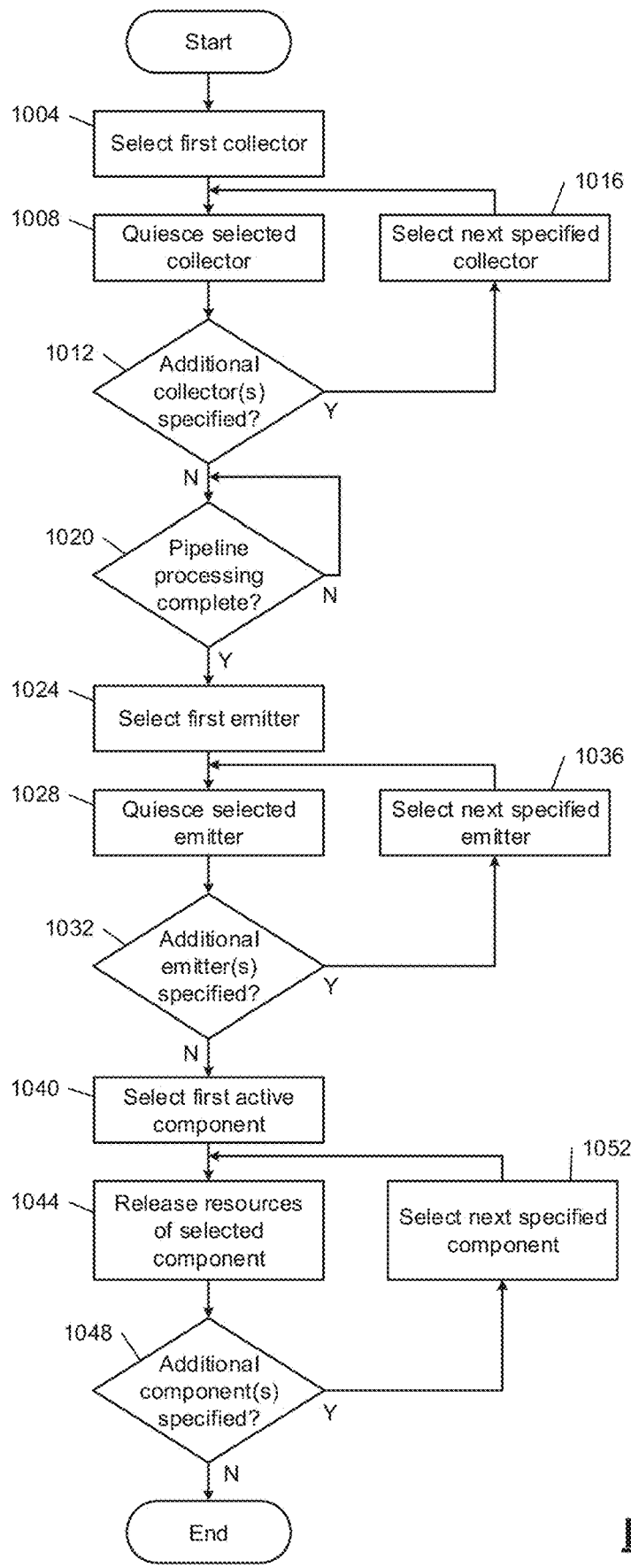
FIG. 13 is a flowchart showing example shutdown procedures for a component according to the principles of the present disclosure.

At 958 of FIG. 12B, control determines whether a reconfiguration command has been received. If so, control transfers to 960; otherwise, control transfers to 962. At 960, control shuts down the pipeline in order to process the reconfiguration command. For example, the shutdown process may be performed as shown in FIG. 13. Control then returns to 908 of FIG. 12A.

At 962, control determines whether a shutdown command has been received. If so, control transfers to 964; otherwise, control transfers to 966. At 964, control shuts down the pipeline and then ends. For example, the shutdown may be performed as shown in FIG. 13. At 966, control determines whether a collector has been triggered by receiving the payload. If so, control transfers to 968; otherwise, control returns to 958. At 968, control passes the collected information (which may be referred to as a payload) as state data to a first stage of the processing pipeline.

At 970, control processes state data using the first component of the current pipeline stage. At 972, control determines whether there are additional components in the current pipeline stage. If so, control transfers to 974; otherwise, control continues at 976. At 974, control processes state data using the next component of the current pipeline stage and returns to 972. At 976, control determines whether there are additional stages in the processing pipeline. If so, control transfers to 978; otherwise, control continues at 980. At 978, control passes state data to the next stage of the pipeline and returns to 970.

At 980, control selects the first emitter. At 982 control outputs a result of the processing pipeline using the selected emitter. At 984, control determines whether any additional emitters are active. If so, control transfers to 986; otherwise, control returns to 958. At 986, control selects the next emitter and returns to 982.

In FIG. 13, an example shutdown process begins at 1004, where control selects the first collector of the module. At 1008, control quiesces (that is, pauses) the selected collector—in other words, the collector stops obtaining input. At 1012, control determines whether additional collectors are specified. If so, control transfers to 1016; otherwise, control transfers to 1020. At 1016, control selects the next specified collector and returns to 1008.

At 1020, control waits until the pipeline has completed processing on all received data. Once the pipeline processing is complete, control transfers to 1024. At 1024, control selects the first emitter of the module. At 1028, control quiesces the selected emitter. At 1032, control determines whether any additional emitters are specified. If so, control transfers to 1036; otherwise, control transfers to 1040. At 1036, control selects the next specified emitter and returns to 1028.

At 1040, control selects the first active component of the processing pipeline. At 1044, control releases the resources of the selected component. For example, these resources may include memory resources, networking ports, and registration with message distribution services. At 1048, control determines whether additional components are specified for the module. If so, control transfers to 1052; otherwise, control has completed the shutdown and therefore ends. At 1052, control selects the next specified component and returns to 1044.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A non-transitory computer-readable medium storing instructions executable by processor hardware, the instructions comprising:
   executing a first application;
   in response to a first configuration specification:
      configuring a first choreographer of the first application, wherein:
         the first choreographer requires at least one collector and at least one emitter and defines a sequence of processing stages;
         the first configuration specification specifies which of a set of available collectors will be the at least one collector;
         the first configuration specification specifies which of a set of available emitters will be the at least one emitter; and the first configuration specification specifies, for each stage of the sequence of processing stages, which set of processors from a set of available processors will be invoked for the stage;
for each stage of the sequence of processing stages, initiating the set of processors for the stage;
initiating each of the at least one emitter to provide outputs from a final stage of the sequence of processing stages; and
subsequent to initiating the processors and the at least one emitter, initiating each of the at least one collector to acquire input for passage to an initial stage of the sequence of processing stages; and
in response to a reconfiguration request for the first application:
pausing each of the at least one collector;
subsequent to pausing the at least one collector, pausing each stage of the sequence of processing stages;
subsequent to pausing the processors, pausing each of the at least one emitter; and
subsequent to pausing the at least one emitter, configuring the first choreographer according to a second configuration specification.

2. The computer-readable medium of claim 1, wherein:
the set of available processors includes a no-op processor that performs no operation and
the no-op processor can be invoked from any of the sequence of processing stages.

3. The computer-readable medium of claim 1, wherein:
the set of available processors includes an exception processor that throws an exception for debugging purposes and
the exception processor can be invoked from any of the sequence of processing stages.

4. The computer-readable medium of claim 1, wherein:
the set of available collectors includes a representational state transfer (REST) collector configured to receive a hypertext transfer protocol (HTTP) GET request and
the set of available emitters includes a REST emitter configured to transmit an HTTP response message.

5. The computer-readable medium of claim 1, wherein:
the set of available collectors includes a publish-subscribe collector configured to receive messages from a publish-subscribe messaging system and
the set of available emitters includes a publish-subscribe emitter configured to publish messages to the publish-subscribe messaging system.

6. The computer-readable medium of claim 5, wherein the publish-subscribe messaging system is implemented by an Apache Kafka distributed streaming platform.

7. The computer-readable medium of claim 1, wherein:
the set of available collectors includes at least one of (i) a structured query language (SQL) database collector for an SQL database and (ii) a NoSQL database collector for a particular NoSQL database and
the set of available emitters includes at least one of (i) an SQL database emitter and (ii) a NoSQL database emitter for the particular NoSQL database.

8. The computer-readable medium of claim 1, wherein the set of available collectors includes at least one of:
a command line interface (CLI) collector configured to receive parameters specified in a command line used to launch the first application and
a pipe collector configured to receive data supplied to the first application by an operating system pipe implemented by an operating system executing the first application.

9. The computer-readable medium of claim 1, wherein the instructions further comprise generating a graphical user interface that:
displays, to a developer, names and metadata for:
a set of available choreographers including the first choreographer;
at least some of the set of available collectors;
at least some of the set of available emitters; and
at least some of the set of available processors and
constructs a configuration specification based on selection by the developer of one of the set of available choreographers, at least one of the set of available collectors, and at least one of the set of available emitters.

10. The computer-readable medium of claim 1, wherein the first choreographer is at least one of:
a choreographer that defines the sequence of processing stages to facilitate transformation of data from a first format to a second format and
a choreographer that defines the sequence of processing stages to facilitate processing and responding to queries.

11. The computer-readable medium of claim 10, wherein:
the first format is a record from a structured query language (SQL) database and
the second format is a document to be written to a NoSQL database.

12. The computer-readable medium of claim 10, wherein:
the first format is extensible markup language (XML) and
the second format is JavaScript Object Notation (JSON).

13. A computer-implemented method comprising:
executing a first application;
in response to a first configuration specification:
configuring a first choreographer of the first application, wherein:
the first choreographer requires at least one collector and at least one emitter and defines a sequence of processing stages;
the first configuration specification specifies which of a set of available collectors will be the at least one collector;
the first configuration specification specifies which of a set of available emitters will be the at least one emitter; and
the first configuration specification specifies, for each stage of the sequence of processing stages, which set of processors from a set of available processors will be invoked for the stage;
for each stage of the sequence of processing stages, initiating the set of processors for the stage;
initiating each of the at least one emitter to provide outputs from a final stage of the sequence of processing stages; and
subsequent to initiating the processors and the at least one emitter, initiating each of the at least one collector to acquire input for passage to an initial stage of the sequence of processing stages; and
in response to a reconfiguration request for the first application:
pausing each of the at least one collector;
subsequent to pausing the at least one collector, pausing each stage of the sequence of processing stages;
subsequent to pausing the processors, pausing each of the at least one emitter; and
subsequent to pausing the at least one emitter, configuring the first choreographer according to a second configuration specification.

14. The method of claim 13, wherein:
the set of available collectors includes a representational state transfer (REST) collector configured to receive a hypertext transfer protocol (HTTP) GET request and
the set of available emitters includes a REST emitter configured to transmit an HTTP response message.

15. The method of claim 13, wherein:
the set of available collectors includes a publish-subscribe collector configured to receive messages from a publish-subscribe messaging system and
the set of available emitters includes a publish-subscribe emitter configured to publish messages to the publish-subscribe messaging system.

16. The method of claim 13, wherein:
the set of available collectors includes at least one of (i) a structured query language (SQL) database collector for an SQL database and (ii) a NoSQL database collector for a particular NoSQL database and
the set of available emitters includes at least one of (i) an SQL database emitter and (ii) a NoSQL database emitter for the particular NoSQL database.

17. The method of claim 13, wherein the set of available collectors includes at least one of:
a command line interface (CLI) collector configured to receive parameters specified in a command line used to launch the first application and
a pipe collector configured to receive data supplied to the first application by an operating system pipe implemented by an operating system executing the first application.

18. The method of claim 13, further comprising generating a graphical user interface that:
displays, to a developer, names and metadata for:
a set of available choreographers including the first choreographer;
at least some of the set of available collectors;
at least some of the set of available emitters; and
at least some of the set of available processors and
constructs a configuration specification based on selection by the developer of one of the set of available choreographers, at least one of the set of available collectors, and at least one of the set of available emitters.

19. The method of claim 13, wherein the first choreographer is at least one of:
a choreographer that defines the sequence of processing stages to facilitate transformation of data from a first format to a second format and
a choreographer that defines the sequence of processing stages to facilitate processing and responding to queries.

20. A system comprising:
memory hardware configured to store instructions and
processing hardware configured to execute the instructions stored by the memory hardware,
wherein the instructions include:
executing a first application;
in response to a first configuration specification:
configuring a first choreographer of the first application, wherein:
the first choreographer requires at least one collector and at least one emitter and defines a sequence of processing stages;
the first configuration specification specifies which of a set of available collectors will be the at least one collector;
the first configuration specification specifies which of a set of available emitters will be the at least one emitter; and
the first configuration specification specifies, for each stage of the sequence of processing stages, which set of processors from a set of available processors will be invoked for the stage;
for each stage of the sequence of processing stages, initiating the set of processors for the stage;
initiating each of the at least one emitter to provide outputs from a final stage of the sequence of processing stages; and
subsequent to initiating the processors and the at least one emitter, initiating each of the at least one collector to acquire input for passage to an initial stage of the sequence of processing stages; and
in response to a reconfiguration request for the first application:
pausing each of the at least one collector;
subsequent to pausing the at least one collector, pausing each stage of the sequence of processing stages;
subsequent to pausing the processors, pausing each of the at least one emitter; and
subsequent to pausing the at least one emitter, configuring the first choreographer according to a second configuration specification.

\* \* \* \* \*